L. DASER.
Sextant.
No. 27,891.
Patented April 17, 1860.
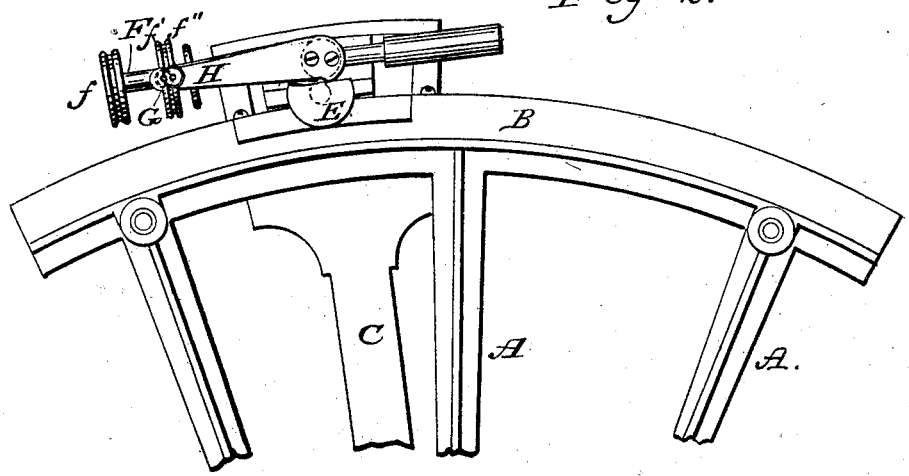
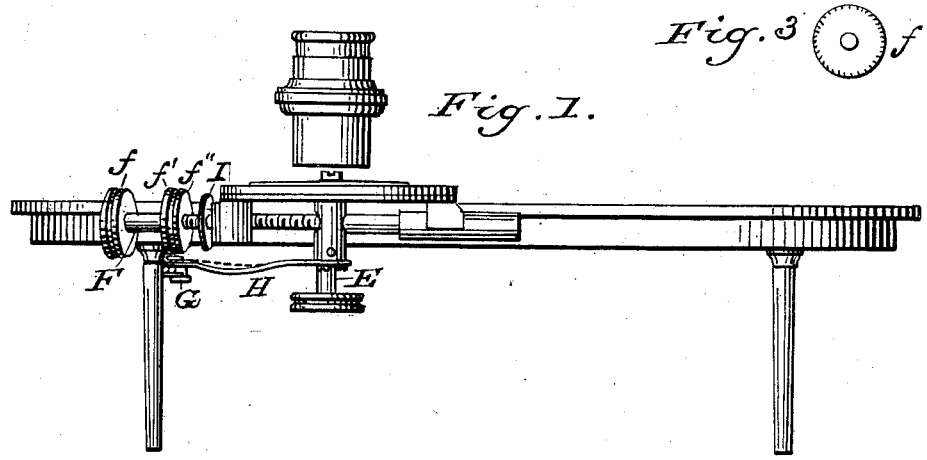
Witnesses.
Octavius Knight
James H. Gridley
Inventor:
L. Daser

UNITED STATES PATENT OFFICE.

LOUIS DASER, OF WASHINGTON, DISTRICT OF COLUMBIA.

SEXTANT.

Specification of Letters Patent No. 27,891, dated April 17, 1860.

*To all whom it may concern:*

Be it known that I, LOUIS DASER, of Washington city, in the District of Columbia, have invented certain new and useful Improvements in Sextants; and I hereby declare the following to be a full and exact description of the same, reference being had to the accompanying drawings, making part of this specification.

Astronomical observation with a sextant, that is to measure the angle which a celestial body makes with the horizon or with another celestial body has evidently to do with two varying quantities: the time and the angle. As the angle varies every instant and in a different ratio to the time, it is impossible to repeat the measurement of the same angle; still it is highly important, that the geographical position of a station or place be not dependent on one observation only, and it is therefore usual to measure the increasing or decreasing angles repeatedly and note the time of each observation, in order to obtain a better result, as the probability is that the errors of the observations will fall on both sides of the reality. For this purpose the observer has in using the ordinary sextant, to take down the sextant after each observation, in order to read the arc, and in this way to change alternately from telescopic to microcoscopic application of his eye. This change not only strains his eye highly but renders him unable to make his observations with as great accuracy. Further, it requires time for the eye to get accustomed to a different application, and more time to find the contact again after the reading of the arc. Thus a considerable period elapses during a series of observations and in that time in the case of the sun the declination and in all cases the refraction change perceptibly; which, if a mean observation is computed, gives an inaccurate result, and if each individual observation is computed, increases the labor of computing to a great degree.

The present improvements consist, 1st, in a device by which a series of observations may be taken with great rapidity without removing the eye from the telescope. 2nd, in an appliance employed in taking "equal altitudes" to indicate the portion of the tangent screw previously used.

In the accompanying drawings Figure 1 is an elevation of a sextant embodying my improvements, viewed from its lower edge. Fig. 2 is a plan of a portion of its rear side. Fig. 3 is an elevation of one of the micrometer wheels hereinafter described.

The frame A, arc, B limb C, vernier D and clamping screw E, may be of customary construction and arrangement and therefore require no specific description.

F is a micrometer screw occupying the place of the customary tangent screw and provided with a head $f$ for rotating it with the finger and thumb and with one or more micrometer wheels $f'$, $f''$, each formed with equidistant notches around its periphery.

G is an adjustable click attached to a spring H which keeps it in contact with either of the micrometer wheels to which it may be adjusted.

I is a stop nut which may be set upon the tangent screw F, so as to indicate the portion of the screw used in a previous observation.

The operation is as follows: The heavenly body to be observed, being brought nearly into coincidence with the horizon by setting and clamping the limb at the proper point in customary manner, the limb is moved by means of the tangent screw until the click G enters a notch in the micrometer wheel the mirrors being at the same time slightly in advance of coincidence. Upon the observed body reaching the point of coincidence the word is given to the recorder, who marks the time and the observer without removing his eye from the telescope rotates the tangent screw to the extent of one notch and again awaits the period of coincidence, when the word is given as before. By this means a series of observations may be taken with very great rapidity no time being expended in reading and recording from the arc. After the conclusion of a series of observations their results are read in succession from the arc by a reverse motion of the micrometer screw.

In the present illustration the micrometer wheel $f'$ is formed with four notches around its periphery and the wheel $f''$ with sixty so that supposing a revolution of the tangent screw to move the limb ten minutes every notch on the wheel $f'$ will indicate a motion of two minutes and a half and on the wheel $f''$ of ten seconds.

In practice, with a sextant of 8 inches radius a micrometer screw may be employed, of 80 revolutions to the inch and provided with three micrometer wheels divided respectively into four, eight and sixty parts, the first two named being employed for observations for time and the last for circummeridian altitudes for latitude and for moon distances.

The following is what I claim as new and of my invention herein and desire to secure by Letters Patent—

1. The combination of a spring click and micrometer wheel with the tangent screw of a sextant substantially as and for the purpose set forth.

2. The combination with the tangent screw of a sextant, of the stop nut I for the purpose explained.

In testimony of which invention, I hereunto set my hand.

L. DASER.

Witnesses:
JAMES M. GRIDLEY,
OCTAVIUS KNIGHT.